(12) United States Patent
Kimura et al.

(10) Patent No.: US 11,072,534 B2
(45) Date of Patent: Jul. 27, 2021

(54) DIIODOSILANE PRODUCING METHOD

(71) Applicant: YAMANAKA HUTECH CORPORATION, Kyoto (JP)

(72) Inventors: Naoto Kimura, Kyoto (JP); Yasushi Yamamoto, Chigasaki (JP); Shigeaki Yonemori, Fujisawa (JP)

(73) Assignee: YAMANAKA HUTECH CORPORATION, Kyoto (JP)

( * ) Notice: Subject to any disclaimer, the term of this patent is extended or adjusted under 35 U.S.C. 154(b) by 140 days.

(21) Appl. No.: 16/514,007

(22) Filed: Jul. 17, 2019

(65) Prior Publication Data

US 2020/0123016 A1 Apr. 23, 2020

(30) Foreign Application Priority Data

Oct. 18, 2018 (JP) .............................. JP2018-196468

(51) Int. Cl.
*C01B 33/107* (2006.01)
*C01B 33/04* (2006.01)

(52) U.S. Cl.
CPC ................................. *C01B 33/107* (2013.01)

(58) Field of Classification Search
CPC .............................. C01B 33/04; C01B 33/107
See application file for complete search history.

(56) References Cited

U.S. PATENT DOCUMENTS

| 2016/0264426 A1 | 9/2016 | Kerrigan et al. |
| 2018/0099872 A1* | 4/2018 | Ritter ................ C23C 16/45525 |
| 2019/0337968 A1* | 11/2019 | Thivierge .............. C01B 33/107 |

FOREIGN PATENT DOCUMENTS

| CN | 110 606 491 A | 12/2019 |
| EP | 3 112 340 A1 | 1/2017 |
| JP | H07-252271 A | 10/1995 |
| JP | 2018-519233 A | 7/2018 |
| WO | 2017/201456 A1 | 11/2017 |

OTHER PUBLICATIONS

Mar. 17, 2020 Office Action issued in Japanese Patent Application No. 2018-196468.
Mar. 19, 2020 Extended Search Report issued in European Patent Application No. 19194951.0.
Keinan, Ehud et al., "Diiodosilane. 1. A Novel Reagent for Deoxygenation of Alcohols and Ethers", J. Org. Chem.,vol. 52, 1987, pp. 4846-4851.

* cited by examiner

*Primary Examiner* — Ngoc-Yen Nguyen
(74) *Attorney, Agent, or Firm* — Oliff PLC

(57) ABSTRACT

Industrial-scale production of diiodosilane through reaction between phenylsilane and iodine is safely and efficiently performed. Provided is a diiodosilane producing method wherein reaction is started between phenylsilane and iodine at a low temperature, the method including at least the step of, after dropping and mixing step finishes, pumping a reaction solution little by little continuously while raising a temperature thereof.

8 Claims, 3 Drawing Sheets

DIIODOSILANE PRODUCING METHOD

BACKGROUND OF THE INVENTION

1. Field of the Invention

The present invention relates to an industrial production method for producing iodosilane, particularly iodosilane used as a film forming material for use in an electronic material.

2. Description of Related Art

Halosilanes including iodosilane are widely used as a raw material in a case where silicon containing films such as films containing silicon nitride are formed by the chemical vapor deposition (CVD) method, the atomic layer deposition (ALD) method, or the like in the semiconductor manufacture.

Particularly, diiodosilane have drawn attention from the viewpoints of its high reactivity and the vapor pressure, and the demand for it has increased in recent years.

The method for synthesizing diiodosilane has been known for a long time, and it is reported that diiodosilane is produced through two stages of reaction between phenylsilane and iodine.

The reaction between phenylsilane and iodine is difficult to start, since it is a solid-liquid reaction. In addition, since it is an exothermic reaction, it is difficult to set such conditions that the reaction can be continued stably. Particularly in the final stage of the reaction, the solid body of iodine decreases in size, thereby having a greater specific surface area, becoming highly active. This therefore makes it very difficult to control the reaction stably.

Keinan et al. carried out this reaction under solventless conditions, in such a small scale as an NMR tube (inner diameter: about 4 mm), under such a low temperature as −20° C. (see Non-patent Document 1 indicated below). Kerrigan et al. propose a producing method in a scale of 3 L; regarding the reaction therein, cooling is carried out in a low-temperature bath at −65° C. so that the temperature is controlled in a range of −6° C. to +6° C., and thereafter, the temperature is carefully returned to room temperature over 15 hours (see Patent Document 1 indicated below). This suggests that raw materials to which the reaction has not occurred yet remain even in the final stage. In the producing method proposed by Kerrigan et al., the reaction scale is increased as compared with Keinan et al., but to perform the reaction on the industrial scale, there remain many problems to be solved.

PRIOR ART DOCUMENT

Patent Document

Patent Document 1: US Patent Application Publication 2016/0264426

Non-Patent Document

Non-patent Document 1: J. Org. Chem. Vol. 52, 1987, pp. 4846-4851

BRIEF SUMMARY OF THE INVENTION

Problem to be Solved by the Invention

To produce diiodosilane in a scale suitable for the industrial production, it is preferable to perform the reaction under such conditions that enable the production of, for example, at least 10 L or more, more preferably 30 L or more, or alternatively, in some cases, 100 L or more, by charging a large amount of raw materials at once and additionally shortening the reaction period. Here, if a large amount of raw materials is charged and caused to react, however, there is a great possibility that heat is abruptly generated and causes the reaction to become out of control. It is therefore necessary to reconsider the method for controlling the reaction temperature so as to prevent the reaction from becoming out of control.

To promote the progression of the reaction by performing the reaction at a reaction temperature increased to some extent in order to shorten the reaction period has been known, but there is a fear that this could lead to a serious accident if the reaction in a case where it is caused to occur with a large amount of raw materials being charged cannot be prevented from runaway reaction.

The reaction between phenylsilane and iodine, for producing diiodosilane, is a two-stage reaction as indicated below, in which the first-stage reaction as a solid-liquid reaction is a bottleneck, and the second-stage reaction, which is a dephenylation reaction with hydrogen iodide, proceeds more quickly as compared with the first stage. The accumulation of hydrogen iodide in the system, therefore, is considered to be small. Both of the first-stage reaction and the second-stage reaction are exothermic reactions, and when the first-stage reaction proceeds, immediately heat generation occurs in both of the first-stage reaction and the second-stage reaction. To cope with this is very important.

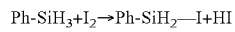

$Ph\text{-}SiH_3 + I_2 \rightarrow Ph\text{-}SiH_2\text{—}I + HI$

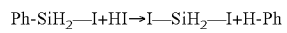

$Ph\text{-}SiH_2\text{—}I + HI \rightarrow I\text{—}SiH_2\text{—}I + H\text{-}Ph$ where Ph represents a phenyl group.

How to remove heat of reaction so as to prevent the reaction from becoming out of control while the reaction is kept going is the key to the control of heat generation. As the reaction scale increases, the volume that generates heat increases cubically, whereas the surface that is cooled increases only squarely. The cooling method and the control of temperature are therefore significantly important.

As a result of earnest study, the inventors of the present invention found that the reaction scale can be increased safely by causing a reaction solution little by little to pass through temperature-controlled pipes continuously, thereby arriving at the present invention.

Means to Solve the Problem

In other words, the present invention is a method for producing diiodosilane, the method including the step of causing phenylsilane and iodine to react with each other under the presence of a solvent.

Further, the present invention is particularly preferably a method for producing diiodosilane by dropping phenylsilane and a catalyst to a mixture of a solvent and iodine in a reaction vessel, the method including the step of taking a reaction mixture containing the solvent, iodine, phenylsilane, the catalyst and a reaction product out of the reaction vessel little by little continuously or occasionally, and pumping the reaction mixture while raising a temperature of the reaction mixture.

Effect of the Invention

With the present invention, industrial-scale production of diiodosilane through reaction between phenylsilane and iodine can be safely and efficiently performed.

In the method for producing diiodosilane by dropping phenylsilane and a catalyst to a mixture of a solvent and iodine in a reaction vessel, particularly the following step is included: continuously or occasionally taking a reaction mixture containing the solvent, iodine, phenylsilane, the catalyst and a reaction product out of the reaction vessel little by little, and pumping the reaction mixture while raising a temperature of the reaction mixture. With this method, the reaction rate is increased owing to the temperature rise. Besides, since the reaction mixture is taken out of the reaction vessel little by little continuously or occasionally and is pumped while the temperature thereof is being raised, it is easy to control the reaction temperature, even if the reaction rate is increased owing to the temperature rise. This method makes it possible to reduce the risk that the reaction would become out of control.

Further, an aspect wherein the temperature in the step of continuously or intermittently taking the reaction mixture out of the reaction vessel little by little and pumping the same while raising the temperature is set to +20 to +60° C. is adopted preferably. This method is more preferable since this causes the reaction rate to increase, makes it easy to control the reaction temperature, and further makes it possible to reduce the risk that the reaction would become out of control.

Still further, an aspect wherein the mixture of the solvent and iodine in the reaction vessel is charged into the reaction vessel at a low temperature in a range of −20° C. to −100° C. is adopted preferably. This configuration is more preferable since in a case where phenylsilane and catalyst are dropped, this configuration makes it possible to prevent a rapid rise of the reaction temperature, thereby preventing the reaction from becoming out of control.

Still further, an aspect wherein the solvent is an aprotic solvent that does not react with diiodosilane and that has a difference from diiodosilane regarding the boiling point is adopted preferably. This configuration is more preferable since diiodosilane as a target to be obtained can be easily collected by distillation in high yield.

Still further, the solvent is preferably chloroform. This configuration is preferable since in a case where the solvent and benzene are removed by distillation after the reaction finishes so that diiodosilane is purified, diiodosilane as a target to be obtained can be easily collected in high yield.

DETAILED DESCRIPTION OF THE INVENTION

Figure 1:
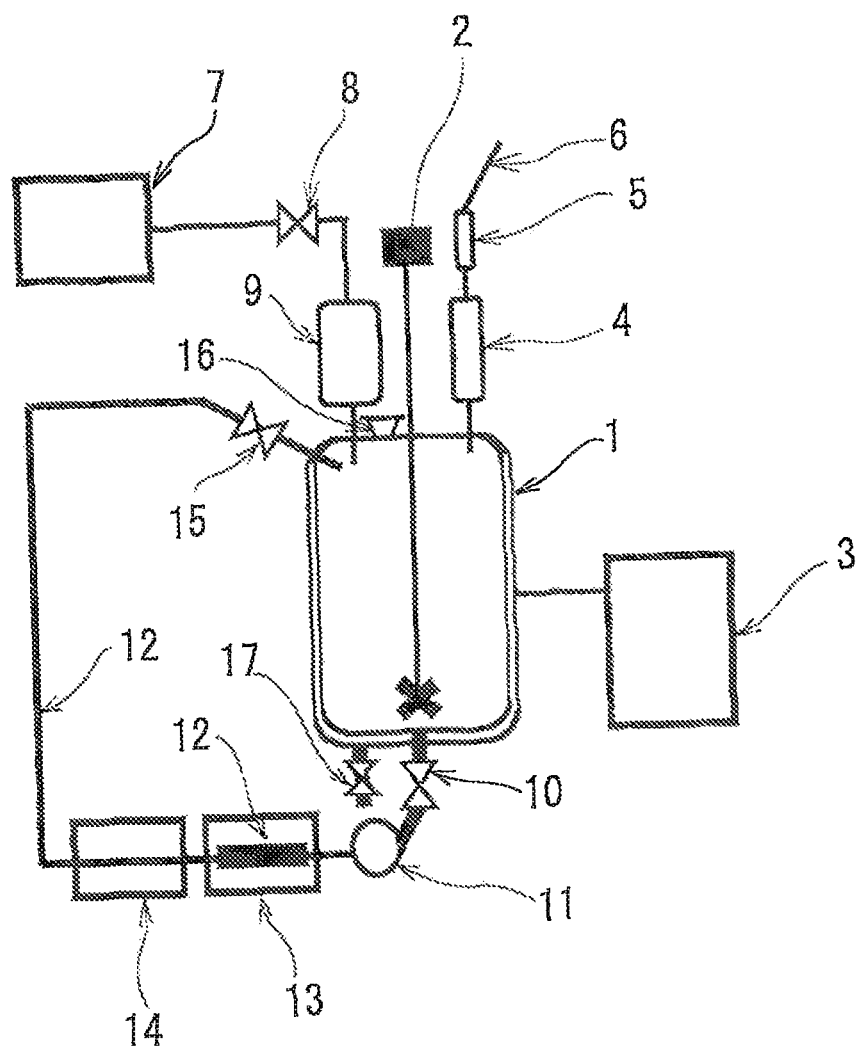
FIG. 1 schematically illustrates an exemplary reaction device of the present invention for producing diiodosilane.

In an industrial method for producing diiodosilane according to the present invention, phenylsilane and iodine are caused to react with each other under the presence of a solvent, and regarding the size of a reaction vessel used herein, though not particularly limited, the internal volume of the reaction vessel is 10 L or more, preferably 30 L or more, more preferably 40 L or more for the industrial production, while the upper limit is not particularly regulated. In a case where the size is excessively large, however, enormous energy is needed to keep the temperature inside the reaction vessel at a relatively low level so as to prevent the reaction from going out of control, for example, in a case where phenylsilane and a catalyst are dropped into the reaction vessel in which iodine and solvent are charged, so as to cause the reaction start, and in a subsequent period while the reaction is continued. The size of the reaction vessel is therefore desirably 200 L or less, or preferably 100 L or less.

Regarding the reaction, iodine and a solvent are charged in the reaction vessel when the reaction starts. The temperature of the reaction vessel is adjusted by circulating a refrigerant of the chiller through a jacket of the reaction vessel so that a low temperature in a range of −100 to +10° C., preferably in a range of −30 to 0° C., or more preferably in a range of −20 to −10° C. can be kept. Thereafter, typically, phenylsilane and a catalyst at room temperature are dropped into the reaction vessel so as to cause the reaction to start. Here, the temperature inside the reaction vessel rises, but while phenylsilane and the catalyst are being dropped, the temperature inside the reaction vessel is preferably controlled so as to be in a range of −100° C. to +30° C.

After the dropping of phenylsilane and the catalyst finishes, the temperature inside the reaction vessel is kept in a range of −100 to +10° C., preferably in a range of −30 to 0° C., or more preferably in a range of −20 to −10° C. The reaction is started in this way, and the method of the present invention preferably includes the step of continuously or occasionally taking a reaction mixture out of the reaction vessel little by little, and pumping the reaction mixture while raising the temperature, the reaction mixture in the reaction vessel containing the solvent, iodine, phenylsilane, the catalyst and a reaction product. In a case where the reaction is not completed even through such a temperature-raising pumping step, the following step is repeated until the reaction is completed: returning this reaction mixture to the same reaction vessel, or introducing the reaction mixture into another reaction vessel, and continuously or occasionally taking the reaction mixture out of the reaction vessel little by little, and pumping the reaction mixture while raising the temperature. The temperature inside the reaction vessel in this case is preferably kept in a range of −100 to +10° C., preferably in a range of −30 to 0° C., more preferably in a range of −20 to −10° C.

In the following description of the diiodosilane producing method of the present invention, the present invention is described with reference to exemplary reaction devices used therein. The reference to the reaction devices in the description, however, is intended to facilitate the understanding of the present invention, and the reaction device used in the present invention is not limited to these devices illustrated in the drawings.

An exemplary reaction device used in the present invention is schematically illustrated in FIG. 1 (when diiodosilane is separated from a mixture of obtained diiodosilane, benzene as a by-product, a solvent, and the like, the separation is carried out typically by distillation, but the illustration of a distillation device is omitted. The same applies to the other drawings).

In FIG. 1, "1" denotes a reaction vessel whose side and lower surfaces are provided with thermostatic jackets for cooling; "2" denotes a mechanical stirrer; "3" denotes a chiller for controlling the temperature of a refrigerant of the thermostatic jackets; "4" denotes a condenser (a heat exchanger for cooling); "5" denotes a pressure release valve; "6" denotes an exhaust pipe; "7" denotes an inert gas supplier for supplying inert gas such as nitrogen gas, argon gas, etc. (a cylinder can be used); "8" denotes a valve (for supplying inert gas); "9" denotes a dropping funnel; "10" denotes a valve (for pumping the reaction mixture); "11" denotes a circulation pump; "12" denotes a pipe (in this example, a static mixer is incorporated therein); "13" denotes a thermostatic chamber for raising and keeping the temperature of the reaction mixture whose temperature is kept at a low level in the reaction vessel, at a desired level (for example +20 to +30° C.) so as to promote the reaction of the reaction mixture; "14" denotes a thermostatic chamber for lowering and keeping the temperature at a desired level (for example, −50 to +10° C.) so as to control the reaction well; "15" denotes a valve (a valve for charging the reaction mixture containing an unreacted material into the reaction vessel [a valve for returning the reaction mixture into the reaction vessel 1 in the case of FIG. 1]); "16" denotes a raw material charging port (for charging the solvent and iodine; the configuration thereof is such that the lid thereof can be closed.); "17" denotes a valve from which the reaction mixture is taken out when the reaction ends (the configuration, however, may be such that the valve 10 or 15 is a three-way valve, and the reaction mixture may be taken out through the same when the reaction ends.). In the above-described configuration, though the thermostatic chamber 14 is illustrated in the drawings, it does not have to be provided in a case where an operation is performed under such conditions that the temperature of the reaction mixture is raised to a not so high level in the thermostatic chamber 13 (the same applies to the thermostatic chambers 14*a*, 14*b*, 14*c* illustrated in FIG. 2 or 3).

In the case where the reaction device illustrated in FIG. 1 referred to above is used, an inert gas such as nitrogen gas or argon gas (preferably nitrogen gas) is charged in the reaction device from the inert gas supplier 7 through the valve 8 opened so as to fill the reaction device, and thereafter, a solvent and iodine is charged through the raw material charging port 16 into the reaction vessel 1. The temperature in the reaction vessel is adjusted by circulating the refrigerant of the chiller through the jackets of the reaction vessel so that a low temperature in a range of −100 to +10° C., preferably −30 to 0° C., or more preferably −20 to −10° C. can be kept. Thereafter, phenylsilane and a catalyst are dropped by the dropping funnel 9 so that the reaction starts; when the reaction starts, the temperature in the reaction vessel tends to rise, but as described above, when phenylsilane and the catalyst are dropped, the temperature in the reaction vessel is preferably controlled so as to be in a range of −100° C. to +30° C. After the dropping of phenylsilane and the catalyst finishes, the temperature in the reaction vessel is adjusted by circulating the refrigerant of the chiller through the jackets of the reaction vessel so that a low temperature in a range of −100 to +10° C., preferably −30 to 0° C., more preferably −20 to −10° C. can be kept. Here, it is preferable that the inside of the reaction vessel is stirred all times by the stirrer 2.

Iodine for use in the reaction is in a solid state when it is used, and is preferably in a granulated state obtained by granulation in dry inert gas. Iodine in a solid granular form is preferably spherically granulated, since it easily flows through the pipe 12 and the like. The particle size is not particularly limited. If the particle size is too large, however, the specific surface area thereof is so small that the reaction becomes slow; on the other hand, if iodine in a powder form having a very small particle size is used at the charging stage, there is a possibility that the temperature rises rapidly due to the reaction proceeding. It is therefore preferable to use iodine having a particle size (the largest diameter) in a range of 0.1 to 10 mm, more preferably in a range of 0.1 to 5 mm, further more preferably in a range of 0.1 to 3 mm.

As the solvent, an aprotic solvent that is not azeotropic with diiodosilane and that has a difference from the reaction product regarding the boiling point is used; the boiling point difference under atmospheric pressure is preferably, for example, +1 to +100° C., preferably +20 to +100° C., or more preferably +60 to +100° C., and the boiling point of the solvent may be higher or lower than the boiling point of diiodosilane of 140° C. Further, the aprotic solvent is not particularly limited, but an aprotic solvent having a boiling point under atmospheric pressure in a range of +50 to +120° C. is more preferable.

As a specific example of the solvent, other than a hydrocarbon-based solvent, a halogenated hydrocarbon-based solvent is used, examples of which include chloroform (having a boiling point of 61° C.), dichloromethane (having a boiling point of 40° C.), heptafluorohexane (having a boiling point of 71° C.), and decafluoropentane (having a boiling point of 55° C.), among which chloroform is particularly preferable from the viewpoints of the boiling point difference, the inflammability, the iodine solubility, the property of being not azeotropic with diiodosilane, and the cost. It should be noted that an aprotic solvent usually does not have much solubility in iodine, but a halogen-based solvent has some solubility in the same. The reason why iodine in a granular form is used is that the improvement of the stirring performance is intended.

The amount of the solvent to be used is not particularly limited, but the weight of the solvent with respect to the weight of iodine is preferably 50 to 500% by weight, or more preferably 100 to 200% by weight.

The temperature in the reaction vessel is adjusted by circulating the refrigerant of the chiller through the jackets of the reaction vessel so that a low temperature in a range of −100 to +10° C., preferably in a range of −30 to 0° C., or more preferably in a range of −20 to −10° C. can be kept in the reaction vessel.

Next, phenylsilane and a catalyst are dropped with use of the dropping funnel 9 and are stirred by the stirrer 2, so that the reaction is started. The temperature in the reaction vessel, as described above, rises when phenylsilane and the catalyst are dropped. The temperature in the reaction vessel, however, is preferably kept in a range of −100 to +30° C., and in the step for aging the reaction after the dropping finishes, the temperature in the reaction vessel is kept in a range of −100 to +10° C., preferably in a range of −30 to 0° C., or more preferably −20 to −10° C., while the stirring is carried out.

The catalyst to be used is not particularly limited, but examples of the same include ethyl acetate, palladium (II) acetate, triphenylphosphine oxide, and palladium chloride, among which ethyl acetate is preferable.

Regarding the ratio of phenylsilane and iodine to be used, the ratio of the number of moles of iodine with respect to the number of moles of phenylsilane is typically in a range of 80 to 150%, preferably in a range of 90 to 120%, or more preferably in a range of 100 to 110%.

The amount of catalyst to be used depends on the type of the catalyst, but it is preferably about 5 to 10% by weight with respect to the weight of phenylsilane.

The stirring speed of the stirrer 2 is not particularly limited, but it is typically about 100 to 500 rpm.

Figure 2:
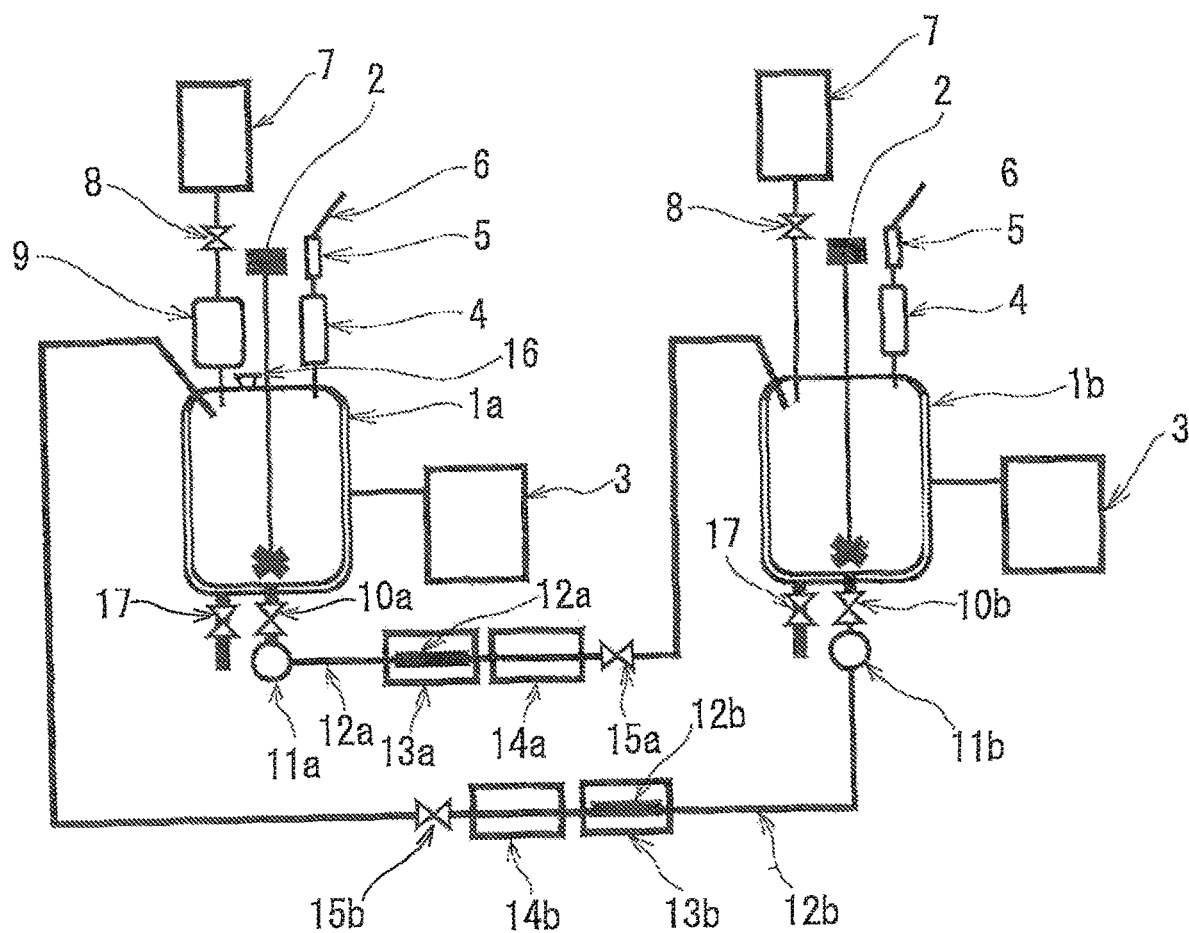
FIG. 2 schematically illustrates another exemplary reaction device of the present invention for producing diiodosilane.
Figure 3:
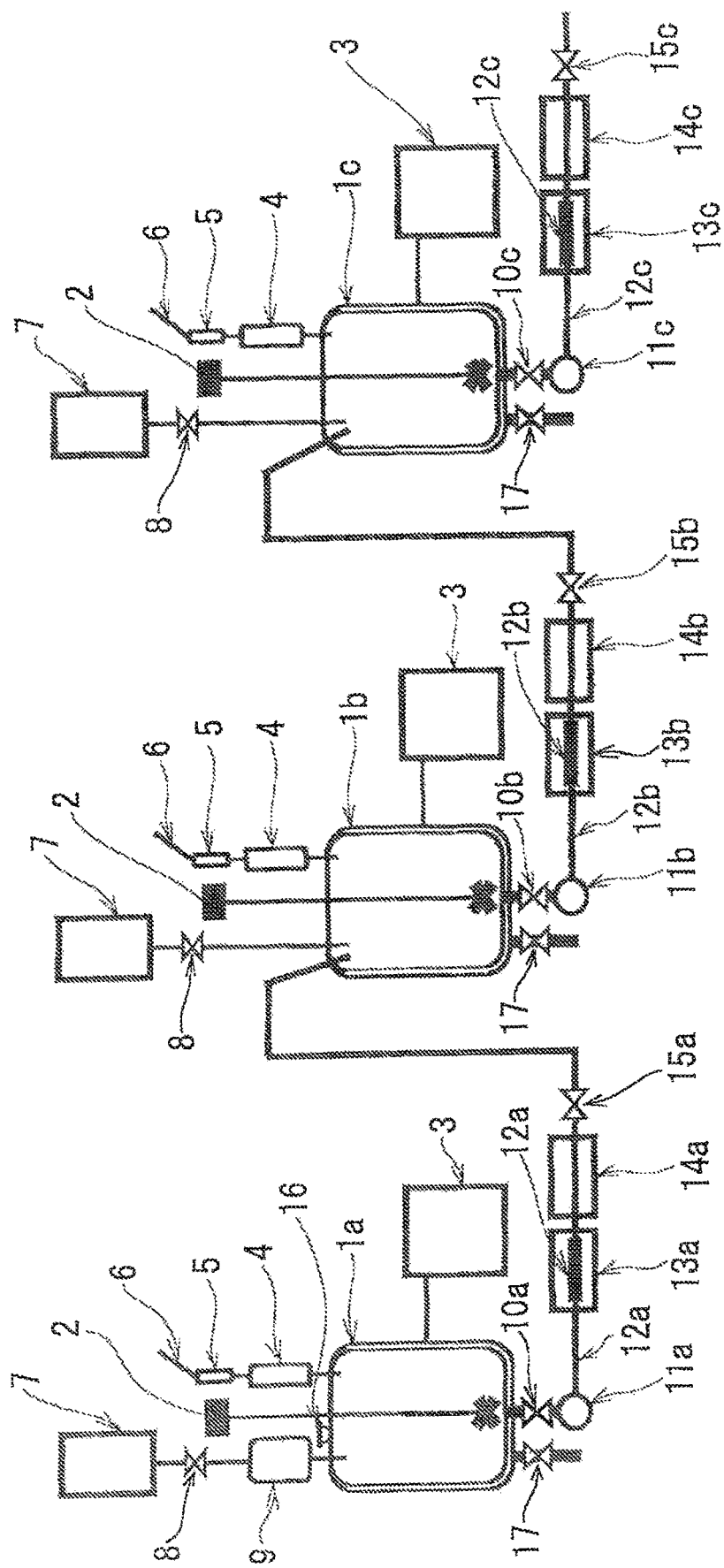
FIG. 3 schematically illustrates still another exemplary reaction device of the present invention for producing diiodosilane.

The step of taking the reaction mixture out of the reaction vessel little by little continuously or occasionally, and pumping the same while raising the temperature of the same, is preferably a step that is performed in a pipe for pumping the reaction mixture, the pipe being attached to the reaction vessel; the step of pumping the reaction mixture and raising the temperature of the reaction mixture, performed in the pipe, is preferably any one of the following:

(a) two or more reaction vessels are used, and the step is performed in a pipe that links adjacent reaction vessels (one way: for an example, see FIG. 3; FIG. 3 illustrates an exemplary case where three reaction vessels are used);

(b) in the above-described step (a), the reaction mixture is returned from the last reaction vessel to any one of the reaction vessels, and the step of pumping the reaction mixture and raising the temperature of the reaction mixture is performed repeatedly in each pipe until the reaction mixture is finally taken out of the above-described last reaction vessel (repeat operation: for an example, see FIG. 2; FIG. 2 illustrates an exemplary case where two reaction vessels are used); or (c) one reaction vessel is used, and the step of pumping the reaction mixture and raising the temperature of the reaction mixture in the pipe through which the reaction mixture taken out of the reaction vessel is returned again to the reaction vessel is performed repeatedly (circulating operation: for an example, see FIG. 1).

Further, in any one of the steps, in a pipe through which the reaction mixture is taken out of the last reaction vessel, a step of further pumping the reaction mixture and raising the temperature of the reaction mixture may be performed.

In the initial stage of the reaction, low-temperature stirring in which the temperature in the reaction vessel is at $-20°$ C. or below may be continuously carried out for several hours as an aging step, though this however depends on the scale of the reaction.

Next, the following description more specifically describes each step while referring to the drawings.

In the configuration illustrated in FIG. 1, the solvent and iodine are charged into the reaction vessel through the raw material charging port 16, and the temperature therein is kept in a range of $-100$ to $+10°$ C., preferably in a range of $-30$ to $0°$ C., or more preferably in a range of $-20$ to $-10°$ C. The mixture solution of phenylsilane and the catalyst is dropped with use of the dropping funnel 9, then the reaction starts, and the temperature rises. As described above, however, although the temperature rises when phenylsilane and the catalyst are dropped, it is preferable to keep the temperature in the reaction vessel 1 in a range of $-100$ to $+30°$ C., and thereafter, the reaction mixture whose temperature is kept in the above-described range is aged in the inside of the reaction vessel 1 while being stirred. The reaction mixture is flowed to the pipe 12 occasionally or continuously little by little, by opening the valve 10 and causing the circulation pump 11 to operate, and the reaction is accelerated by raising the temperature to a desired level in the thermostatic chamber 13. Typically, the temperature in the pipe in the thermostatic chamber 13 is kept in a range of $+20°$ C. to $+60°$ C., preferably in a range of $+20°$ C. to $+50°$ C., or more preferably in a ranged $+20°$ C. to $+30°$ C. As the pipe whose temperature is controlled, a thin pipe having a small diameter, immersed in the thermostatic chamber 13, may be used, or alternatively a heat exchanger may be used. In some cases, the temperature-controlled pipe may have an internal structure that can cancel a temperature gradient inside the pipe, typified by a static mixer. A static mixer is a mixer of a static type (a line mixer) that does not have a driving unit functioning as follows: fluid entering the mixer is sequentially stirred by elements.

Here, the term of "reaction mixture" means a substance that exists in the reaction system, encompassing a mixture of raw materials (including a catalyst), and substances that are present in the reaction system while the reaction is proceeding and when the reaction is finished, having contents and a composition that vary depending on the reaction state. More specifically, at the start of the reaction, the main component is the mixture of raw materials and a solvent, containing a small amount of a reaction product; as the reaction is proceeding and drawing to a close, the ratio of the raw materials decreases while the ratio of the solvent and the reaction product increases; and eventually when the reaction is completed, most of the substances that are present in the reaction system is the reaction product and the solvent, though varying with the yield. The substances of these respective stages are covered by the term of "reaction mixture"; in other words, this term encompasses the mixture of raw materials, and substances that are present in the reaction system while the reaction is proceeding and when it is finished.

As a material for the pipe 12, an inert material that does not cause reaction with the reaction mixture is preferred, which is such as glass, tetrafluoroethylene perfluoroalkoxyethylene copolymer resin (PFA), ceramics, SUS, titanium, Hastelloy (Ni/Cr/Mo/Fe alloy), or the like. The diameter of the pipe 12 depends on the size of the reaction vessel, and is not particularly limited, but typically the inner diameter is in a range of 2 mm to 30 mm, or preferably in a range of 3 mm to 20 mm. If the pipe has a too small diameter, the productivity tends to decrease, and if it has a too great diameter, the temperature controllability tends to decrease. In some case, a plurality of thin pipes may be arrayed in parallel, or a heat exchanger having a similar structure may be used. The length of the pipe, though not particularly limited, is in a range of 10 cm to 10 m, and may incorporate an internal structure that improves the stirring efficiency, for example, the above-mentioned static mixer.

Thereafter, the reaction mixture is returned through the valve 15 to the reaction vessel again. As described above, the drawings including FIG. 1 illustrate the thermostatic chambers 14, 14a, 14b, 14c, but these thermostatic chambers 14, 14a, 14b, 14c are unnecessary in a case where the cooling is less necessary.

The step of flowing the reaction mixture little by little through the pipe 12 whose temperature is kept by the thermostatic chamber 13 in a temperature range of $+20°$ C. to $+60°$ C. may be carried out continuously, or alternatively, may be carried out occasionally, with the temperature rise in the thermostatic chamber 13 being checked.

The step of causing the reaction mixture to pass little by little through the pipe whose temperature is constantly kept in the range of $+20°$ C. to $+60°$ C. may be carried out while the reaction mixture is caused to pass between two reaction vessels (for an example, see FIG. 3), or in some cases, while the step may be carried out while the reaction mixture is caused to repeatedly pass between two or more reaction vessels (for an example, see FIG. 2). Alternatively, the reaction mixture may be recycled in one reaction vessel (for an example, see FIG. 1). The temperature range for the step of pumping the reaction mixture through the pipe while the temperature is raised continuously is +20 to $+60°$ C., preferably, $+20°$ C. to $+50°$ C., or more preferably $+20°$ C. to $+30°$ C. At a stage where the reaction has not proceeded sufficiently yet, before the reaction mixture is returned to the reaction vessel, a step of cooling the reaction mixture to a temperature around the temperature in the above-described reaction vessel, that is, in a range of −100 to +10° C., preferably in a range of −30 to 0° C., or more preferably in a range of −20 to −10° C. before the reaction mixture is returned to the reaction vessel may be provided, with use of the thermostatic chamber 14 or the like.

The passing rate at which the reaction mixture is caused to pass little by little through the pipe whose temperature is kept constant, though not particularly limited, is typically about 0.1 to 50% by weight per minute with respect to the total amount of the reaction mixture, preferably about 1 to 30% by weight per minute, or more preferably about 5 to 20% by weight per minute.

Further, the flow velocity is not particularly limited, but the reaction mixture may be flowed at a rate of 100 ml to 50 L per minute (in a range that is not incompatible with the above-described passing rate of typically about 0.1 to 50% by weight per minute, preferably about 1 to 30% by weight per minute, more preferably about 5 to 20% by weight per minute with respect to the total amount of the reaction mixture).

The end of the reaction is the time when no more solid iodine is left in the reaction vessel, and the valve 17 is opened so that the reaction mixture is taken out; however, how to take out the reaction mixture is not limited particularly, and the reaction mixture may be taken out through any place if there is such a place; for example, the configuration may be such that the valve 10 or the valve 15 is a three-way valve and the reaction mixture may be taken out through the same as described above. Whether there is any more iodine in the reaction vessel is therefore visually confirmed, and at least a part of the reaction vessel or the pipe is preferably made of transparent glass or PFA. The reaction vessel made of glass or lined with glass is preferable since no reaction occurs with any raw materials used or any generated products.

The obtained reaction mixture is subjected to separation and purification so that diiodosilane is separated, typically by distillation, from the solvent and benzene as a by-product. In order to obtain diiodosilane of higher purity, two-stage distillation is preferable.

The distillation may be carried out by transferring the contents from the reaction vessel to a distillation still, or alternatively, simple distillation may be carried out from the reaction vessel directly. When the contents are transferred from the reaction vessel to a distillation still, the contents may be taken out through the valve 17, which is located in a lower part of the reaction vessel, or alternatively, a three-way valve is used as the valve 10 or the valve 15 and the contents may be take out therethrough.

Next, the following description describes an exemplary reaction device of still another embodiment used in the present invention illustrated in FIG. 2.

The reaction device illustrated in FIG. 2 has two pipe routes along which the reaction mixture is caused to pass through the pipe little by little. One of the two pipe routes is as follows: the reaction mixture is caused to pass between two or more reaction vessels (the first reaction vessel 1a, the second reaction vessel 1b) (10a: valve, 11a: circulation pump, 12a: pipe, 13a: thermostatic chamber for raising and keeping the temperature at a high level, 14a: thermostatic chamber for lowering and keeping the temperature at a desired temperature for controlling the reaction well (the thermostatic chamber 14a is unnecessary usually in a case where the temperature does not have to be lowered), 15a: valve (a valve for introducing the reaction mixture contain-ing an unreacted material into the second reaction vessel 1b). The other of the two pipe routes is as follows: the reaction mixture is returned from the second reaction vessel 1b to the first reaction vessel 1a (10b: valve, 11b: circulation pump, 12b: pipe, 13b: thermostatic chamber for raising and keeping the temperature at a high level, 14b: thermostatic chamber for lowering and keeping the temperature at a desired temperature for controlling the reaction well (the thermostatic chamber 14b is unnecessary usually in a case where the temperature does not have to be lowered), 15b: valve (a valve for returning the reaction mixture containing an unreacted material to the first reaction vessel 1a). The same members in the drawing as those in FIG. 1 are denoted by the same reference symbols and the descriptions of the same are omitted. Further, the members denoted by the same reference symbols, with alphabetic character reference symbols being excluded, have substantially the same functions as those of the members denoted by the same reference numeral symbols in FIG. 1, except for the above-described points. In this case as well, various types of conditions such as the temperatures in the pipes and the temperature conditions of the reaction vessels are identical those in the embodiment described above with reference to FIG. 1, and therefore the descriptions of the same are omitted. At a stage where the reaction has not proceeded sufficiently yet, like the case illustrated in FIG. 1, a step of cooling the reaction mixture to a temperature at a level similar to the level of the temperature in the above-described reaction vessel, that is, in a range of −100 to +10° C., preferably in a range of −30 to 0° C., or more preferably in a range of −20 to −10° C. before the reaction mixture is returned to the reaction vessel, may be provided with use of the thermostatic chambers 14a and 14b or the like.

It should be noted that the second reaction vessel does not have a dropping funnel 9 or a raw material charging port 16; the second reaction vessel however may have a dropping funnel or a raw material charging port 16.

Further, the number of the reaction vessels may be increased as required, so as to be more than the number of the same illustrated in the drawings. The reaction vessels other than the first reaction vessel among the reaction vessels usually do not have to be equipped with a dropping funnel or a raw material charging port.

Next, the following description describes a reaction device of another embodiment example illustrated in FIG. 3.

The reaction device illustrated in FIG. 3 is an exemplary reaction device in a case where a step of causing a reaction mixture to pass through a pipe little by little is carried out by causing the reaction mixture to pass between two or more reaction vessels; the same members as those illustrated in FIG. 1 are denoted by the same reference symbols, and the descriptions of the same are omitted.

In FIG. 3, the reaction mixture, having passed through the pipe 12a of the first reaction vessel 1a, is not returned to the first reaction vessel 1a, but is introduced into another reaction vessel, i.e., the second reaction vessel 1b, through the valve 15a. Various types of conditions such as temperatures in the pipes (12a, 13a) and temperature conditions in the reaction vessels 1a, 1b in this case are identical to those in the above-described example of the embodiment with reference to FIG. 1, and the descriptions of the same are therefore omitted. The reaction mixture, having passed through the pipes (12b, 13b) of the second reaction vessel 1b, is introduced into another reaction vessel, i.e., the third reaction vessel 1c, through the valve 15b. In this case as well, the various types of conditions such as the temperatures in the pipes and the temperature conditions of the reaction vessels are identical to those in the example of the embodiment described above with reference to FIG. 1, and the descriptions of the same are therefore omitted. Then, the reaction mixture, the reaction of which is eventually completed, is taken out through the valve 17 of the third reaction vessel 1c, or in some cases, is taken out through the pipes (12c, 13c) of the third reaction vessel 1c, so as to be collected. Like in the cases illustrated in FIGS. 1 and 2, at a stage where the reaction has not proceeded sufficiently yet, a step of cooling the reaction mixture to a temperature at a level similar to the level of the temperature in the above-described reaction vessel, that is, in a range of −100 to +10° C., preferably in a range of −30 to 0° C., or more preferably in a range of −20 to −10° C. before the reaction mixture is returned to the reaction vessel may be provided, with use of the thermostatic chambers 14a and 14b or the like. The thermostatic chambers 14a, 14b, 14c are thermostatic chambers for lowering and keeping the temperature to the above-mentioned desired temperature in a case where the reaction has to be well controlled, but in a case where the temperature does not have to be lowered, the thermostatic chambers are not always necessary.

In this drawing, the reaction is completed by causing the reaction mixture to pass through the three reaction vessels, but in a case where the reaction is not completed, the configuration may be such that more reaction vessels and pipes are provided. Alternatively, the reaction mixture may be returned from the third reaction vessel to the second reaction vessel, or the reaction mixture may be further circulated between the second and third reaction vessels. In the case of continuous production, the type illustrated in FIG. 3 is preferable, but it costs much.

In the reaction device illustrated in FIG. 3 as well, the same members in the drawing as those in FIG. 1 are denoted by the same reference symbols and the descriptions of the same are omitted. Further, the members denoted by the same numeral reference symbols, with alphabetic character reference symbols being excluded, have substantially the same functions as those of the members denoted by the same reference symbols in FIG. 1, except for the above-described points. In this case as well, various types of conditions such as the temperatures in the pipes and the temperature conditions of the reaction vessels are identical those in the embodiment described above with reference to FIG. 1, and therefore the descriptions of the same are omitted.

It should be noted that the reaction vessels other than the first reaction vessel do not have a dropping funnel 9 or a raw material charging port 16; these reaction vessels however may have a dropping funnel or a raw material charging port.

EXAMPLE

The following description further describes the present invention by referring to examples, but the present invention is not limited to these examples.

Example 1

(Synthesis with Use of Chloroform Solvent, 10 L Reaction Vessel)

Chloroform solvent, 3000 ml, as a synthetic solvent, and iodine, 3012.5 g (11.87 mol), were charged in a 10000 ml flask equipped with a thermometer, a condenser (cooling at −40° C.), a dropping funnel, and a mechanical stirrer. The inside of the reaction vessel was cooled to −30° C. with a refrigerant from a chiller, and a mixture solution of phenylsilane, 1214.0 g (11.22 mol) and ethyl acetate, 40 ml, was dropped over 140 minutes while being stirred with a stirrer. While it was being dropped, the solution temperature gradually rose to about −10° C., but no rapid temperature rise was recognized. After the dropping finished, the following operation was repeated over six hours: in the operation, the reaction mixture solution was caused to pass through a static mixer at a rate of 300 ml/min with use of a pump, the static mixer being provided in a pipe that went through a thermostatic chamber that was kept at +30° C.; next, the reaction mixture solution was caused to pass through a pipe that went through a thermostatic chamber that was kept at −30° C.; and the reaction mixture solution was returned to the reaction vessel. After it was confirmed that no iodine remained, the cooling of the reaction vessel was stopped, and the reaction mixture solution was again caused to pass through the thermostatic chamber 13 that was kept at +20° C., and when it was confirmed that the temperature of the reaction mixture solution did not rise to above room temperature, the reaction was stopped. It should be noted that this device did not incorporate a thermostatic chamber for making a reaction well-controlled, like the thermostatic chamber denoted by the reference symbol 14 illustrated in FIG. 1. The liquid collected was subjected to two-stage pressure-reduced distillation (concentration temperature: 45° C. (51.3 kPa), distillation temperature: 60° C. (6.9 kPa)), resulting in that diiodosilane, 2277.3 g (yield=72%), was obtained.

Example 2

(Synthesis with Use of Chloroform Solvent, 50 L Reaction Vessel)

Chloroform solvent, 15 L, as a synthetic solvent, and iodine, 15.08 kg (59.42 mol), were charged in a 50 L reaction vessel illustrated in FIG. 1, which is equipped with a thermometer, a condenser (cooling at −40° C.), a dropping funnel, and a mechanical stirrer, and that was filled with nitrogen gas. The inside of the reaction vessel was cooled to −30° C. with a refrigerant from a chiller, and a mixture solution of phenylsilane, 6.07 kg (56.09 mol) and ethyl acetate, 200 ml, was dropped over 300 minutes while it was stirred. While it was being dropped, the solution temperature gradually rose to about 0° C., but no rapid temperature rise was recognized. After the dropping finished, the following operation was repeated over twelve hours: in the operation, the reaction mixture solution was caused to pass through a static mixer at a rate of 1 L/min with use of a pump, the static mixer being provided in a pipe that went through a thermostatic chamber 13 that was kept at 30° C.; next, the reaction mixture solution was caused to pass through a pipe that went through a thermostatic chamber 14 that was kept at −30° C.; and the reaction mixture solution was returned to the reaction vessel. After it was confirmed that no iodine remained, the cooling of the reaction vessel was stopped, and the reaction mixture solution was again caused to pass through the thermostatic chamber 13 that was kept at 20° C. and the thermostatic chamber 14 that was kept at 20° C., and when it was confirmed that the temperature of the reaction mixture solution did not rise to above room temperature, the reaction was stopped. The liquid collected was subjected to pressure-reduced distillation (under the same conditions as those in Example 1), resulting in that diiodosilane, 11.62 kg (yield=73%), was obtained.

Comparative Example 1

(NEAT Solventless Synthesis)

Iodine, 118.2 g (0.47 mol), was charged in a 500 ml flask equipped with a thermometer, a condenser (cooling at −40° C., an argon gas balloon was provided on the upper part of the condenser), a dropping funnel, and a mechanical stirrer. The cooling was carried out until the temperature became −78° C. (dry ice/methanol bath), and phenylsilane, 46.5 g (0.43 mol), was dropped while being stirred. After it was confirmed that phenylsilane was frozen, ethyl acetate, 1.2 ml, was dropped, and the stirring was continued until the temperature rose to room temperature. During stirring, a rapid temperature rise was recognized when the temperature was in the vicinity of −20° C., and the temperature rose to near 40° C., then gradually lowered (to −5° C.). Here, the balloon gradually expanded. The stirring was continued until the temperature rose to room temperature, and was further continued for 24 hours after the temperature arrived at room temperature, then, the stirring was stopped. The liquid collected was subjected to pressure-reduced distillation (distillation temperature: 60° C. (6.9 kPa)), resulting in that diiodosilane, 59.5 g (yield=49%), was obtained.

As is clear from this result, only a small amount of diiodosilane was produced, the yield was poor, and the producing process requires long time. This method was not suitable for the industrial production.

Comparative Example 2

(Synthesis with Use of Chloroform Solvent, 500 ml Reaction Vessel)

chloroform, 100 ml, as a synthesis solvent, and iodine, 103.7 g (0.41 mol) was charged in a 500 ml flask equipped with a thermometer, a condenser (cooling at −40° C., an argon gas balloon was provided on the upper part of the condenser), a dropping funnel, and a mechanical stirrer. The cooling was carried out until the temperature became −76° C. (dry ice/methanol bath), and a mixture solution of phenylsilane, 44.4 g (0.41 mol), and ethyl acetate, 3.0 ml, was dropped over 20 minutes while being stirred. During stirring, no rapid temperature rise was recognized, and the stirring was continued until the temperature rose to room temperature. The stirring was further continued for 24 hours more after the temperature arrived at room temperature, and then, the stirring was stopped. The liquid collected was subjected to pressure-reduced distillation (under the same conditions as those in Example 1), resulting in that diiodosilane, 70.0 g (yield=60%), was obtained.

As is clear from this result, the solvent was used and the scale was increased, as compared with Comparative Example 1, but only a small amount of diiodosilane was produced though it took long time, and the yield was poor. This method was not suitable for the production in an industrial scale.

Comparative Example 3

(Synthesis with Use of Chloroform Solvent, 3000 ml Reaction Vessel)

A 3000 ml flask equipped with a thermometer, a condenser (cooling at −40° C.), a dropping funnel, and a mechanical stirrer was filled with nitrogen gas, and chloroform solvent, 1400 ml, and iodine, 1518.4 g (5.98 mol), were charged therein. The inside of the reaction vessel was cooled to −30° C. with a refrigerant from a chiller, and a mixture solution of phenylsilane, 611.6 g (5.65 mol) and ethyl acetate, 24.0 ml, was dropped at −30° C. over 130 minutes while being stirred. While it was being dropped, the solution temperature gradually rose to about −10° C., but no rapid temperature rise was recognized. After the dropping finished, the temperature was raised by 5° C. at a rate of 1° C./min, then, the solution was kept at the raised temperature for ten minutes, and thereafter the temperature was allowed to further rise until arriving at room temperature, while the solution was stirred continuously. After the temperature arrived at room temperature, the stirring was further continued for 24 hours more, and then, the stirring was stopped. The liquid collected was subjected to pressure-reduced distillation (under the same conditions as those in Example 1), resulting in that diiodosilane, 1220.1 g (yield=76%), was obtained.

As is clear from this result, the solvent was used and the scale was further increased, as compared with Comparative Example 2, but diiodosilane was produced not in a sufficient amount suitable for the industrial production, in spite that an extremely long period was spent for it. This method was not suitable for the production in an industrial scale.

Comparative Example 4

(Synthesis with Use of Chloroform Solvent, 3000 ml Reaction Vessel, Dropping Temperature=−20° C.)

Synthesis was carried out in the same manner as that of Comparative Example 3 except that the temperature in the reaction vessel (flask) when a mixture solution of phenylsilane and ethyl acetate was dropped was changed to −20° C. During the dropping, the solution temperature gradually rose to about 0° C., but no rapid temperature rise was recognized. After the pressure-reduced distillation (under the same conditions as those in Example 1), diiodosilane, 1211.3 g (yield=75%), was obtained.

As is clear from this result, the temperature when phenylsilane and ethyl acetate were dropped was set higher than that in Comparative Example 3, but diiodosilane was obtained in almost the same amount as that in Comparative Example 3, and the producing process requires long time. This method therefore was not suitable for the production in an industrial scale.

Comparative Example 5

(Synthesis with Use of Chloroform Solvent, 3000 ml Reaction Vessel, Dropping Temperature=−10° C.)

Synthesis was carried out in the same manner as that of Comparative Example 3 except that the temperature in the reaction vessel (flask) when a mixture solution of phenylsilane and ethyl acetate was dropped was changed to −10° C. During the dropping, the solution temperature gradually rose to about 0° C., but no rapid temperature rise was recognized. After the pressure-reduced distillation (under the same conditions as those in Example 1), diiodosilane, 1219.1 g (yield=76%), was obtained.

As is clear from this result, the temperature when phenylsilane and ethyl acetate were dropped was set higher than that in Comparative Example 4, but diiodosilane was obtained in almost the same amount as that in Comparative Example 3 or 4, and the producing process requires long time, which was not enough to be suitable for the industrial production. This method therefore was not suitable for the production in an industrial scale. This proved that the rise of the temperature when phenylsilane and ethyl acetate are dropped does not make a significant contribution to an increase in the production amount.

Comparative Example 6

(Synthesis with Use of Chloroform Solvent, Shortened Phenylsilane-Dropping Period)

Synthesis was carried out in the same manner as that of Comparative Example 3 except that the period while a mixture solution of phenylsilane and ethyl acetate was dropped was changed to 60 minutes. During the dropping, the solution temperature gradually rose to about 10° C. No rapid temperature rise was recognized, but as the temperature seemed to tend to rise further, the dropping was stopped. After it was confirmed that the solution temperature lowered, the dropping was further continued. After pressure-reduced distillation (under the same conditions as those in Example 1), diiodosilane, 1250.1 g (yield=78%), was obtained.

As is clear from this result, there seems to be a risk that the temperature in the reaction system would rise if the period while phenylsilane and ethyl acetate are dropped was shortened as compared with Comparative Example 3. Besides, diiodosilane was obtained in almost the same amount as that in Comparative Example 3, which was not enough to be suitable for the industrial production, in spite that a considerably long period was spent for producing the same. This method therefore was not suitable for the production in an industrial scale. This proved that an increase in the dropping rate for dropping phenylsilane and ethyl acetate (the shortening of the dropping period) does not make any contribution to an increase in the production amount.

Comparative Example 7

(Synthesis with Use of Chloroform Solvent, Increased Phenylsilane-Dropping Period)

Synthesis was carried out in the same manner as that of Comparative Example 3 except that the period while a mixture solution of phenylsilane and ethyl acetate was dropped was changed to 240 minutes. During the dropping, the solution temperature was almost constant, and no rapid temperature rise was recognized. After pressure-reduced distillation (under the same conditions as those in Example 1), diiodosilane, 1220.1 g (yield=76%) was obtained.

As is clear from this result, the risk that the temperature in the reaction system would rise could be decreased even if the period while phenylsilane and ethyl acetate were dropped was increased as compared with Comparative Example 3, but diiodosilane was obtained in almost the same amount as that in Comparative Example 3, which was not enough to be suitable for the industrial production, although a considerably long period was spent for producing the same. This method therefore was not suitable for the production in an industrial scale. This proved that a decrease in the dropping rate for dropping phenylsilane and ethyl acetate (the shortening of the dropping period) does not make any contribution to an increase in the production amount.

Comparative Example 8

(Synthesis with Use of Chloroform Solvent, Increased Period of Stirring at Room Temperature)

Steps were carried out that were the same as those in Comparative Example 3 except that the stirring period after a mixture solution of phenylsilane and ethyl acetate was dropped and the temperature arrived at room temperature was changed to 48 hours. As a result, diiodosilane, 1253.6 g (yield=78%), was obtained.

As is clear from this result, even if the above-described stirring period is increased to twice, so as to be longer than that in Comparative Example 3, diiodosilane was obtained in almost the same amount as that in Comparative Example 3, which was not enough to be suitable for the industrial production, in spite that an extremely long period was spent for producing the same. This method therefore was not suitable for the production in an industrial scale. This proves that even if the stirring period after the temperature in the reaction system arrived at room temperature is increased, this does not make a contribution to an increase in the production amount.

Comparative Example 9

(Synthesis with Use of Chloroform Solvent, 10000 ml Reaction Vessel)

Chloroform solvent, 3000 ml, as a synthetic solvent, and iodine, 3012.5 g (11.87 mol), were charged in a 10000 ml flask that is equipped with a thermometer, a condenser (cooling at −40° C.), a dropping funnel, and a mechanical stirrer, and in which nitrogen gas was filled. The inside of the reaction vessel was cooled to −30° C. with a refrigerant from a chiller, and a mixture solution of phenylsilane, 1214.0 g (11.22 mol), and ethyl acetate, 40 ml, was dropped over 140 minutes while being stirred. While the mixture solution was being dropped, the solution temperature gradually rose to about −10° C., but no rapid temperature rise was recognized. After the dropping finished, the temperature was raised by 5° C. at a rate of 1° C./min, then, the solution was kept at the raised temperature for ten minutes, and thereafter the temperature was allowed to further rise until arriving at room temperature, while the solution was stirred continuously. Here, the solution temperature rose from the vicinity of 15° C. to about 30° C. without stopping. When the temperature of the chiller was lowered to 0° C., the solution temperature lowered. Then, the stirring was continued for one hour at 0° C., the temperature was raised at a rate of 1° C./min to 5° C., and the stirring was carried out for one hour. Here, the solution temperature was 10° C., which was clearly different from the temperature of the chiller (5° C.). Thereafter, the temperature was raised at a rate of 1° C./min to 20° C., the stirring was continued further for 24 hours, then the stirring was stopped. The liquid collected was subjected to pressure-reduced distillation (under the same conditions as those in Example 1), resulting in that diiodosilane, 1834.5 g (yield=58%), was obtained.

The production was carried out in almost the same scale as that in Example 1. Comparative Example 9, however, does not have a step of continuously or occasionally taking the reaction mixture out of the reaction vessel little by little, and pumping the same while raising the temperature. In this method, therefore, the step period was long, the production was small, and a poor yield was provided as compared with Example 1. It is therefore not suitable for the industrial production.

Comparative Example 10

(Synthesis with Use of Chloroform Solvent, 10000 ml Reaction Vessel, Temperature Control and Stirring Up to Room Temperature)

The same steps as those in Comparative Example 9 were carried out, and the dropping of a mixture solution of phenylsilane and ethyl acetate was finished. In the step of raising the temperature up to room temperature while stirring the solution after phenylsilane was dropped, the following was carried out: the temperature was raised by 5° C. at a rate of 1° C./min, then, the solution was kept at the raised temperature for ten minutes, and the temperature was raised to 0° C. and was kept for five hours; thereafter, the temperature was raised at a rate of 1° C./min to 5° C., kept at the temperature level for two hours, then, raised at a rate of 1° C./min to 10° C., and kept at the temperature level for one hour. From this level, the temperature was raised at a rate of 1° C./min up to 20° C., and after the temperature arrived at 20° C., the stirring was continued for 24 hours. Here, the solution temperature did not rise over the chiller temperature. The same steps as those in Comparative Example 9 other than the above-described steps were carried out, resulting in that diiodosilane, 1819.4 g (yield=57%) was obtained.

It was possible to raise the temperature back to room temperature in a more stepwise manner as compared with Comparative Example 9, but the step period increased, and further, even though the same device as that in Example 1 was used, the production was small, and a poor yield was provided as compared with Example 1. This method therefore is not suitable for the industrial production.

DESCRIPTION OF REFERENCE NUMERALS

1: reaction vessel
1a: first reaction vessel
1b: second reaction vessel
1c: third reaction vessel
2: stirrer
3: chiller
4: condenser (heat exchanger for cooling)
5: pressure release valve
6: exhaust pipe
7: inert gas supplier
8: valve
9: dropping funnel
10, 10a, 10b, 10c: valve
11, 11a, 11b, 11c: circulation pump
12, 12a, 12b, 12c: pipe
13, 13a, 13b, 13c: thermostatic chamber
14, 14a, 14b, 14c: thermostatic chamber
15, 15a, 15b, 15c: valve
16: raw material charging port
17: valve

TABLE 1

| | Solvent | Theoretical batch yield | Dropping temperature | Dropping period | Step period | Yield | Comments |
|---|---|---|---|---|---|---|---|
| Comp. Ex. 1 | NEAT solventless | 122 g | −76° C. | 1 min | 28 h | 49% | Temperature rose during dropping, from the vicinity of −20° C. to the vicinity of 40° C. |
| Comp. Ex. 2 | Chloroform | 116 g | −76° C. | 20 min | 28 h | 60% | Temperature gradually rose during dropping |
| Comp. Ex. 3 | Chloroform | 1605 g | −30° C. | 130 min | 31 h | 76% | Temperature rose during dropping, to the vicinity of −10° C. |
| Comp. Ex. 4 | Chloroform | 1605 g | −20° C. | 130 min | 31 h | 75% | Temperature rose during dropping, to the vicinity of 0° C. |
| Comp. Ex. 5 | Chloroform | 1605 g | −10° C. | 130 min | 31 h | 76% | Temperature rose during dropping, to the vicinity of 0° C. |
| Comp. Ex. 6 | Chloroform | 1605 g | −30° C. | 60 min | 30 h | 78% | Temperature rose during dropping, to the vicinity of 10° C. |
| Comp. Ex. 7 | Chloroform | 1605 g | −30° C. | 240 min | 33 h | 76% | No temperature rise occurred during dropping. |
| Comp. Ex. 8 | Chloroform | 1605 g | −30° C. | 130 min | 55 h | 78% | Temperature rose during dropping, to the vicinity of −10° C. |
| Comp. Ex. 9 | Chloroform | 3185 g | −30° C. | 140 min | 31 h | 58% | Temperature rose during dropping, to the vicinity of −10° C. Temperature rose during stirring at room temperature. |
| Comp. Ex. 10 | Chloroform | 3185 g | −30° C. | 140 min | 39 h | 57% | Temperature rose during dropping, to the vicinity of −10° C. |
| Ex. 1 | Chloroform | 3185 g | −30° C. | 140 min | 9 h | 72% | Temperature rose during dropping, to the vicinity of −10° C. |
| Ex. 2 | Chloroform | 15924 g | −30° C. | 300 min | 17 h | 73% | Temperature rose during dropping, to the vicinity of 0° C. |

Note)
In the table, "Theoretical batch yield" refers to a production with an assumption that all of the charged raw materials have reacted at a rate of 100%. Actually, all do not react at a rate of 100%, and the yield therefore have to be taken into consideration, too.

The term "dropping" in the "Comments" column in the table means the dropping of a mixture solution of phenylsilane and ethyl acetate.

INDUSTRIAL APPLICABILITY

The diiodosilane producing method of the present invention makes a contribution also to the reduction of the period of steps for producing diiodosilane, which is a raw material in a case where a silicon-containing film made of silicon nitride or the like is produced by the chemical vapor deposition (CVD) method, or the atomic layer deposition (ALD) method in the semiconductor production. The diiodosilane producing method of the present invention is applicable to the industrial production.

The invention claimed is:
1. A method for producing diiodosilane by causing phenylsilane and iodine to react with each other under the presence of a solvent, the method comprising the steps of:
   a) starting a reaction by dropping phenylsilane and a catalyst to a mixture of a solvent and iodine in a reaction vessel controlled at a low temperature in a range of −100° C. to +10° C.,
   b) taking a reaction mixture containing the solvent, iodine, phenylsilane, the catalyst, and a reaction product at a rate of about 0.1 to 50% by weight per minute with respect to the total amount of the reaction mixture, continuously or occasionally out of the reaction vessel controlled at the low temperature,
   c) pumping the reaction mixture from the reaction vessel through a pipe while raising and maintaining a tem- perature of the reaction mixture in the pipe in which the phenylsilane and iodine continue to react, wherein the temperature is from +20° to +60° C., d) taking out the reaction mixture from the pipe when the reaction to produce diiodosilane is completed, or further cooling the reaction mixture and again returning the reaction mixture into the reaction vessel when the reaction is not completed, and e) in a case where the reaction is not completed in the step d), repeating the steps b) to d) until the reaction is completed.

2. The method for producing diiodosilane according to claim 1, wherein the solvent is chloroform.

3. The method for producing diiodosilane according to claim 1, wherein the low temperature is in a range of −30 to 0° C.

4. The method for producing diiodosilane according to claim 1, wherein the low temperature is in a range of −20 to −10° C.

5. The method for producing diiodosilane according to claim 1, wherein the temperature in the step c) is raised to a temperature from +20° to +50° C.

6. The method for producing diiodosilane according to claim 1, wherein the temperature in the step c) is raised to a temperature from +20° to +30° C.

7. The method for producing diiodosilane according to claim 1, wherein the rate is about 1 to 30% by weight per minute with respect to the total amount of the reaction mixture.

8. The method for producing diiodosilane according to claim 1, wherein the rate is about 5 to 20% by weight per minute with respect to the total amount of the reaction mixture.

* * * * *